US009023948B2

(12) United States Patent
Ohnishi

(10) Patent No.: US 9,023,948 B2
(45) Date of Patent: May 5, 2015

(54) CHLOROPRENE RUBBER-BASED POLYMER LATEX COMPOSITION AND USE THEREOF

(71) Applicant: Showa Denko K.K., Minato-ku, Tokyo (JP)

(72) Inventor: Tetsuya Ohnishi, Minato-ku (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/376,674

(22) PCT Filed: Mar. 15, 2013

(86) PCT No.: PCT/JP2013/057518
§ 371 (c)(1),
(2) Date: Aug. 5, 2014

(87) PCT Pub. No.: WO2013/141170
PCT Pub. Date: Sep. 26, 2013

(65) Prior Publication Data

US 2015/0057399 A1 Feb. 26, 2015

(30) Foreign Application Priority Data

Mar. 19, 2012 (JP) ................................ 2012-062275

(51) Int. Cl.
*C08L 27/04* (2006.01)
*C08F 120/68* (2006.01)
*C09J 111/02* (2006.01)

(52) U.S. Cl.
CPC .................................... *C09J 111/02* (2013.01)

(58) Field of Classification Search
USPC .......................... 525/215, 223; 526/347, 318
See application file for complete search history.

(56) References Cited

U.S. PATENT DOCUMENTS 4,060,508 A * 11/1977 Sugahara et al. ............ 523/440
4,479,840 A 10/1984 Takegawa et al.
5,373,065 A * 12/1994 Kitazawa et al. ............ 525/382
2012/0238678 A1 9/2012 Minorikawa et al.
2013/0323589 A1* 12/2013 Yamaguchi et al. .......... 429/211

FOREIGN PATENT DOCUMENTS

| | | | |
|---|---|---|---|
| CA | 2047765 | A1 | 1/1992 |
| JP | 55-149363 | A | 11/1980 |
| JP | 62-096576 | A | 5/1987 |
| JP | 04-023877 | A | 1/1992 |
| JP | 04-298536 | A | 10/1992 |
| JP | 05-320600 | A | 12/1993 |
| JP | 08-120121 | A | 5/1996 |
| JP | 08-311248 | A | 11/1996 |
| JP | 08-319378 | A | 12/1996 |
| JP | 10-195406 | A | 7/1998 |
| JP | 2001-019922 | A | 1/2001 |
| JP | 2001-019923 | A | 1/2001 |
| JP | 2004-043666 | A | 2/2004 |
| JP | 2006-083302 | A | 3/2006 |
| JP | 2007-332207 | A | 12/2007 |
| WO | 2011/065524 | A1 | 6/2011 |

OTHER PUBLICATIONS

International Search Report for PCT/JP2013/057518 dated Jul. 2, 2013 [PCT/ISA/210].

* cited by examiner

*Primary Examiner* — Robert D. Harlan
(74) *Attorney, Agent, or Firm* — Sughrue Mion, PLLC

(57) ABSTRACT

It is an object of the invention to provide a chloroprene rubber-based polymer latex that has a good balance between initial adhesion and storage stability and is suitable for one-component aqueous adhesive applications. The invention relates to a chloroprene rubber-based polymer latex composition containing a mixture of a chloroprene rubber-based polymer latex and a latex of an acrylic or styrene-acrylic resin-based polymer obtained by copolymerization of a specific carboxyl group-containing unsaturated monomer, in which the specific carboxyl group is neutralized with an alkali.

8 Claims, No Drawings

CHLOROPRENE RUBBER-BASED POLYMER LATEX COMPOSITION AND USE THEREOF

CROSS REFERENCE TO RELATED APPLICATIONS

This application is a National Stage of International Application No. PCT/JP2013/057518 filed Mar. 15, 2013 (claiming priority based on Japanese Patent Application No. 2012-062275 filed Mar. 19, 2012), the contents of which are incorporated herein by reference in their entirety.

TECHNICAL FIELD

The invention relates to a chloroprene rubber-based polymer latex composition having high initial adhesive strength and good storage stability. The chloroprene rubber-based polymer latex composition of the invention has a beneficial effect even when at least one of the two adherends bonded therewith is a soft material. In particular, the chloroprene rubber-based polymer latex composition of the invention is most suitable for use in bonding foam to wood, foams together, or other adherends for furniture or building materials. The invention also relates to a chloroprene rubber-based polymer latex composition that is suitable for one-component aqueous adhesive applications, has a high level of initial adhesive strength and storage stability, and also has a good balance between these physical properties.

BACKGROUND ART

Conventional polymers used in adhesives include vinyl acetate resin-based polymers, chloroprene rubber-based polymers, acrylic resin-based polymers, natural rubber, urethane resin-based polymers, or the like. Chloroprene rubber-based polymers are advantageously used in such applications as solvent-based contact adhesives and graft adhesives because they can have high adhesive strength to a wide variety of adherends in low-pressure bonding. However, regulations on volatile organic compounds (VOCs) and solvents become stricter every year because of the risk of ignition in working environments, the cost required to make special ventilation and recovery facilities for preventing ignition, and recent attention to environmental pollution and human health. To meet these demands, water-based adhesives containing chloroprene rubber-based polymer latex have been aggressively developed so that solvents can be eliminated from adhesives. Unfortunately, adhesive performance requirements are very high in the field of conventional solvent-based adhesive applications, and a problem has been pointed out in that the adhesive strength of water-based adhesives is lower than that of conventional solvent-based adhesives.

Thus, to meet an increasing demand particularly for the improvement of the adhesive strength at the initial drying stage, studies have been made on blending two or more types of polymer latexes so that their disadvantages can be compensated for (see, for example, Patent Literature 1). Unfortunately, since different polymer latexes have different pH regions for stable properties, making a random blend of latexes cannot achieve sufficient initial adhesive strength.

To solve this problem, a device is designed to introduce a chloroprene rubber-based polymer latex and a gelling agent such as a metal salt aqueous solution, as two components, into a coating system without blending them until immediately before coating, and to subject them to physical forced mixing in a spray gun part so that salting-out coating can be achieved (see, for example, Patent Literature 2 and Patent Literature 3). Unfortunately, when this type of two-component coating is performed, not only quality control such as a technique to keep the mixing ratio constant is complicated, but also a trouble with the device, such as clogging of the spray gun, can often occur. Thus, there has been a strong demand for one-component adhesives, and adhesive manufacturers have made various investigations to meet such a demand. Studies have also been made to attain a good balance between adhesive performance and storage stability by using chloroprene rubber-based polymer latex in combination with an amino acid or an inorganic salt (see, for example, Patent Literature 4). Basically, such a technique only attains a balance between tradeoffs and cannot provide a fundamental solution to the problems.

Chloroprene rubber-based polymer latex is highly evaluated because it has a high crystallization rate so that the time required to achieve sufficient adhesive strength can be short. To use chloroprene rubber-based polymer latex in the form of a one-component aqueous adhesive composition, however, chloroprene rubber-based polymer latex needs to be blended with a different type of polymer for complementing the insufficient properties of chloroprene rubber-based polymer latex, such as its insufficient initial adhesion rate.

Concerning conventional techniques on chloroprene rubber-based polymer latex, Patent Literature 1 mentioned above discloses a method of blending an acrylic resin-based polymer latex and a urethane resin-based polymer latex for the purpose of providing contact properties. Unfortunately, since different latexes have different pH regions where they are stable, a simple technique such as simple blending of latexes or addition of a common anionic surfactant and/or a common nonionic surfactant has not yet achieved a one-component aqueous adhesive composition having sufficient storage stability.

There is disclosed a technique for producing a chloroprene rubber-based aqueous adhesive having sufficient strength at an initial drying stage and also having a high level of mechanical stability and suitability for spray, in which polyoxyalkylene alkyl ether sulfate and a pH adjuster are added to the adhesive, and it is also disclosed that when the pH adjuster is used to control the pH of the chloroprene rubber-based polymer latex in the range of 7 to 10, the adhesive can have a good initial strength (see, for example, paragraph[0016] of Patent Literature 5). There is also disclosed a technique for producing a chloroprene rubber-based aqueous adhesive having a good balance among initial adhesion, contact property, storage stability, and spray-coatability, in which an acrylic resin latex containing an acrylic resin emulsion and polyoxyalkylene alkyl ether sulfate as a surfactant are added to the adhesive (see, for example, Patent Literature 6). In these techniques, a surfactant that shows a smaller decrease in water solubility even at a pH of 10 or lower is added to a chloroprene rubber-based polymer to inhibit the degradation of the stability of the chloroprene rubber-based polymer at a pH of 10 or lower. Unfortunately, when such a surfactant is used in a larger amount, the chloroprene rubber-based polymer latex can have too high stability, so that during drying, it can be difficult to achieve gelation of the chloroprene rubber-based polymer latex through an insolubilization phenomenon based on the water solubility of abietic acid used as a surfactant. Thus, the mere use of a surfactant in a chloroprene rubber-based polymer latex cannot achieve sufficient storage stability for practical use of the latex as a one-component aqueous adhesive composition with its initial adhesion unchanged.

CITATION LIST

Patent Literature

Patent Literature 1: JP 10-195406 A
Patent Literature 2: JP 55-149363 A
Patent Literature 3: U.S. Pat. No. 4,479,840
Patent Literature 4: JP 2004-43666 A
Patent Literature 5: JP 2007-332207 A
Patent Literature 6: WO 2011/065524 A

SUMMARY OF INVENTION

Technical Problem

It is an object of the invention to provide a chloroprene rubber-based polymer latex that has a good balance between initial adhesion and storage stability and is suitable for one-component aqueous adhesive applications.

Solution to Problem

As a result of earnest studies to solve the problems, the inventors have found that the problems can be solved when a chloroprene rubber-based polymer latex is mixed with a latex of an acrylic or styrene-acrylic resin-based polymer obtained by copolymerization of a specific carboxyl group-containing unsaturated monomer and when the specific carboxyl group is neutralized with an alkali. Hereinafter, embodiments of the invention will be described.

[1] A chloroprene rubber-based polymer latex composition, including a mixture of (A) a chloroprene rubber-based polymer latex and (B) an acrylic resin-based polymer latex and/or a styrene-acrylic resin-based polymer latex, wherein the acrylic resin-based polymer latex and/or the styrene-acrylic resin-based polymer latex (B) contains an acrylic resin-based polymer having 0.5 to 2.5 parts by mass of a unit derived from a carboxyl group-containing unsaturated monomer having a pKa of 4.0 or less at 25° C. and/or a styrene-acrylic resin-based polymer having 0.5 to 2.5 parts by mass of a unit derived from a carboxyl group-containing unsaturated monomer having a pKa of 4.0 or less at 25° C. based on 100 parts by mass of the total amount of monomer units derived from a (meth)acrylic ester and styrene, the carboxyl group is neutralized with an alkali so that a degree of neutralization of 0.7 to 1.3 is attained, and the mass ratio of the solid in the chloroprene rubber-based polymer latex (A) to the solid in the acrylic resin-based polymer latex and/or the styrene-acrylic resin-based polymer latex (B) is from 60/40 to 95/5.

[2] The chloroprene rubber-based polymer latex composition according to item [1], wherein the carboxyl group-containing unsaturated monomer is itaconic acid.

[3] The chloroprene rubber-based polymer latex composition according to item[1] or [2], wherein the chloroprene rubber-based polymer latex (A) contains an anionic surfactant having a carboxyl group.

[4] A chloroprene rubber-based polymer latex composition, including a mixture of (A) a chloroprene rubber-based polymer latex and (B) an acrylic resin-based polymer latex and/or a styrene-acrylic resin-based polymer latex, wherein the acrylic resin-based polymer latex and/or the styrene-acrylic resin-based polymer latex (B) contains an acrylic resin-based polymer having a unit derived from a carboxyl group-containing unsaturated monomer and/or a styrene-acrylic resin-based polymer having a unit derived from a carboxyl group-containing unsaturated monomer, an alkali is added to the acrylic resin-based polymer latex and/or the styrene-acrylic resin-based polymer latex (B), the chloroprene rubber-based polymer latex (A) contains an anionic surfactant having a carboxyl group, and satisfying formula (1):

[Mathematical Formula 1]

$$pKa_1 \geq pKa_2 + 0.6 \quad (1)$$

wherein $pKa_1$ represents the pKa of the anionic surfactant at 25° C., and $pKa_2$ represents the pKa of the carboxyl group at 25° C.

[5] The chloroprene rubber-based polymer latex composition according to item [3] or [4], wherein the anionic surfactant is abietic acid.

[6] A one-component aqueous adhesive including the chloroprene rubber-based polymer latex composition according to any one of items [1] to [5].

Advantageous Effects on Invention

The inventors have made earnest study on techniques for satisfying both initial adhesive strength and storage stability to provide a chloroprene rubber-based polymer latex composition that can have reliable initial adhesive strength based on the inherent high crystallization rate of a chloroprene rubber-based polymer and also have reliable storage stability so that the latex composition can be practically used as a one-component aqueous adhesive composition. As a result, the invention has been accomplished based on findings that the initial adhesion can be improved by mixing (A) a chloroprene rubber-based polymer latex and (B) an acrylic resin-based polymer latex and/or a styrene-acrylic resin-based polymer latex which include or includes an acrylic resin-based polymer and/or a styrene-acrylic resin-based polymer obtained by copolymerization of a specific carboxyl group-containing unsaturated monomer and to which an alkali is added. In the invention, the acrylic resin-based polymer latex and/or the styrene-acrylic resin-based polymer latex (B), which includes or include an acrylic resin-based polymer and/or a styrene-acrylic resin-based polymer obtained by copolymerization of a specific carboxyl group-containing unsaturated monomer and to which an alkali is added, also has a function as a pH adjuster, so that the latex composition of the invention has sufficient initial adhesion even when a low-molecular-mass pH adjuster such as amino acid or boric acid is not added to the latex composition.

DESCRIPTION OF EMBODIMENTS

Hereinafter, the invention will be described in detail. The chloroprene rubber-based polymer latex composition of the invention includes a mixture of (A) a chloroprene rubber-based polymer latex and (B) an acrylic resin-based polymer latex and/or a styrene-acrylic resin-based polymer latex, wherein the acrylic resin-based polymer latex and/or the styrene-acrylic resin-based polymer latex (B) contains an acrylic resin-based polymer having a unit derived from a carboxyl group-containing unsaturated monomer and/or a styrene-acrylic resin-based polymer having a unit derived from a carboxyl group-containing unsaturated monomer, an alkali is added to the acrylic resin-based polymer latex and/or the styrene-acrylic resin-based polymer latex (B), and the chloroprene rubber-based polymer latex (A) preferably contains a surfactant satisfying formula (1):

[Mathematical Formula 2]

$$pKa_1 \geq pKa_2 + 0.6 \quad (1)$$

wherein $pKa_1$ represents the pKa of the surfactant at 25° C., and $pKa_2$ represents the pKa of the carboxyl group at 25° C.

The chloroprene rubber-based polymer latex (A) may be stabilized with an anionic surfactant. The chloroprene rubber-based polymer latex (A) is preferably stabilized with a carboxyl group-containing surfactant, in particular, preferably with an alkali salt of rosin acid composed mainly of abietic acid. Hereinafter, the principle of the invention will be described with reference to an example where abietic acid is used. At around 25° C., abietic acid has a pKa of 4.64 and thus can be almost completely dissociated at a pH of 7 in theory. However, abietic acid has low solubility in water, and its solubility significantly depends on pH. In a solution at a pH lower than 10, therefore, the amount of abietic acid dissolved in water can be insufficient to stabilize a chloroprene rubber-based polymer. In addition, if the pH of such a solution is adjusted to 7 to 10 simply with a pH adjuster, the stability of the chloroprene rubber-based polymer latex (A) can decrease.

Thus, a surfactant that shows a smaller decrease in water solubility even at a pH of 10 or lower can be used together with the chloroprene rubber-based polymer latex (A) so that the reduction in stability can be suppressed even at a pH of 10 or lower. Unfortunately, as the amount of the surfactant used together increases, the chloroprene rubber-based polymer latex (A) becomes too stable, so that during drying, it can be difficult to achieve gelation of the chloroprene rubber-based polymer latex (A) through an insolubilization phenomenon based on the low solubility of abietic acid in water. Thus, if only the surfactant is used together with the chloroprene rubber-based polymer latex (A), it will be difficult to attain a good balance between the initial adhesion and the storage stability.

In the invention, it has been found that pH can be adjusted with no inhibition of gelation of the chloroprene rubber-based polymer latex (A) when the chloroprene rubber-based polymer latex (A) is used in combination with the acrylic resin-based polymer latex and/or the styrene-acrylic resin-based polymer latex (B) to which an alkali is added and which contain or contains an acrylic resin-based polymer obtained by copolymerization of a carboxyl group-containing unsaturated monomer having a pKa of 4.0 or less at 25° C. and/or a styrene-acrylic resin-based polymer obtained by copolymerization of a carboxyl group-containing unsaturated monomer having a pKa of 4.0 or less at 25° C. In this case, the gelation can be allowed to proceed through the use of the water solubility of abietic acid or other materials used as a surfactant for the chloroprene rubber-based polymer latex (A).

When incorporated in the acrylic resin-based polymer or the styrene-acrylic resin-based polymer by copolymerization, a carboxyl group-containing unsaturated monomer can have a pKa higher than that of itself. Thus, if a carboxyl group-containing unsaturated monomer having a pKa higher than 4.0 at 25° C. is copolymerized, the carboxyl group can have a pKa equal to or higher than that of abietic acid. In this case, it can be difficult to obtain, during drying, a pH region where gelation of the chloroprene rubber-based polymer latex (A) is facilitated through an insolubilization phenomenon based on the solubility of abietic acid in water. This can result in a reduction in the initial adhesion of the chloroprene rubber-based polymer latex composition. In this case, during the process where pH is decreased by drying, the carboxyl groups of the acrylic resin-based polymer or the styrene-acrylic resin-based polymer can change from an ionized state to a non-ionized state before or almost simultaneously with the change of the carboxyl group of abietic acid from an ionized state to a non-ionized state, so that the concentration of non-ionized abietic acid in the system may fail to increase and it may be difficult to achieve insolubilization through the use of the solubility of abietic acid in water.

In contrast, when a carboxyl group-containing unsaturated monomer having a pKa of 4.0 or less at 25° C. is copolymerized to form the acrylic resin-based polymer latex or the styrene-acrylic resin-based polymer latex (B), the carboxyl group can have a pKa lower than that of abietic acid, which makes it possible, during drying, to obtain a pH region where gelation of the chloroprene rubber-based polymer latex (A) is achieved through an insolubilization phenomenon based on the solubility of abietic acid in water. This can result in an increase in the initial adhesion of the chloroprene rubber-based polymer latex composition. In this case, during the process where pH is decreased by drying, the carboxyl group of abietic acid can change from an ionized state to a non-ionized state before the change of the carboxyl groups of the acrylic resin-based polymer or the styrene-acrylic resin-based polymer from an ionized state to a non-ionized state, so that the concentration of non-ionized abietic acid in the system can sharply increase and it can be easy to achieve insolubilization through the use of the solubility of abietic acid in water. Although the principle of the invention has been described with reference to an example where abietic acid is used, the surfactant used in the invention is not limited to abietic acid.

In the invention, the acrylic resin-based polymer may be a polymer obtained by copolymerization of a carboxyl group-containing unsaturated monomer having a pKa of 4.0 or less at 25° C. and at least one unsaturated monomer selected from a methacrylic ester, such as methyl methacrylate, ethyl methacrylate, butyl methacrylate, or cyclohexyl methacrylate, and an acrylic ester, such as ethyl acrylate, butyl acrylate, or 2-ethylhexyl acrylate. Besides these monomers, any other monomer copolymerizable with these monomers, such as acrylonitrile or methacrylonitrile, may also be used to form the polymer. The glass transition temperature of the acrylic resin-based polymer can be controlled by combining any of these unsaturated monomers.

In the acrylic resin-based polymer, the content of the monomer unit derived from a (meth)acrylic ester as an unsaturated monomer is preferably from 94.5 to 99.5% by mass, more preferably from 95 to 99% by mass.

In the invention, the styrene-acrylic resin-based polymer may be a polymer obtained by copolymerization of styrene, in addition to the above-mentioned methacrylic ester and/or the acrylic ester, with carboxyl-group containing unsaturated monomer having a pKa of 4.0 or less at 25° C. Besides these monomers, any other monomer copolymerizable with these monomers, such as acrylonitrile or methacrylonitrile, may also be used to form the polymer. The glass transition temperature of the styrene-acrylic resin-based polymer can be controlled by combining any of these unsaturated monomers.

In the styrene-acrylic resin-based polymer, the total content of the unsaturated monomer unit derived from a (meth) acrylic ester(s) and the monomer unit derived from styrene is preferably from 94.5 to 99.5% by mass, more preferably from 95 to 99% by mass. The mass ratio of the monomer unit(s) derived from a (meth)acrylic ester(s) as an unsaturated monomer(s) to the monomer unit derived from styrene is preferably from 5/5 to 9/1, more preferably from 5/5 to 7/3.

Examples of the carboxyl group-containing unsaturated monomer that can be copolymerized to form the acrylic resin-based polymer or the styrene-acrylic resin-based polymer include maleic acid (pKa=2.39), fumaric acid (pKa=3.15), itaconic acid (pKa=3.86), 2-carboxyethyl acrylate (pH=3.95), glutaric acid (pKa=4.19), acrylic acid (pKa=4.25), monoacryloyloxyethyl succinate (pKa=4.35), 2-carboxypropyl acrylate (pH=4.49), methacrylic acid (pKa=4.58), 2-carboxybutyl acrylate (pH=4.63), crotonic acid (pKa=4.80), or the like. Examples of the carboxyl group-containing unsaturated monomer having a pKa of 4.0 or less include maleic acid (pKa=2.39), fumaric acid (pKa=3.15), itaconic acid (pKa=3.86), 2-carboxyethyl acrylate (pH=3.95), or the like. In particular, itaconic acid is preferred because it is highly copolymerizable with acrylic esters and (meth)acrylic esters. When the carboxyl group-containing unsaturated monomer can undergo multiple dissociations, the value indicated herein is the pKa of the first dissociation. The carboxyl group-containing unsaturated monomer having a pKa of 4.0 or less may also be used in combination with a carboxyl group-containing unsaturated monomer having a pKa of more than 4.0 without departing from the gist of the invention. The pKa values shown above are literature data at around 25° C. from SciFinder.

The carboxyl group-containing unsaturated monomer having a pKa of 4.0 or less at 25° C., which can be copolymerized to form the acrylic resin-based polymer or the styrene-acrylic resin-based polymer, preferably has a pKa of 3.9 or less at 25° C. At 25° C., the pKa of the carboxyl group-containing unsaturated monomer is generally, but not limited to, 1.5 or more, preferably 3.0 to 4.0, more preferably 3.5 to 4.0, as long as the pKa at 25° C. is 4.0 or less.

Any other unsaturated monomer having a functional group other than the carboxyl group may also be copolymerized to form the acrylic resin-based polymer or the styrene-acrylic resin-based polymer. Specifically, 2-hydroxyethyl acrylate, 2-hydroxyethyl methacrylate, acrylamide, methacrylamide, diacetone acrylamide, sodium p-styrenesulfonate, or other unsaturated monomers may be copolymerized to improve the stability of the acrylic resin-based polymer latex and/or the styrene-acrylic resin-based polymer latex (B). The total content of the units derived from these unsaturated monomers in the copolymer is preferably 3% by mass or less.

An alkali is added to the acrylic resin-based polymer latex and/or the styrene-acrylic resin-based polymer latex (B) to neutralize the carboxyl groups in the latex (B). In this case, the degree of neutralization of the carboxyl groups is from 0.7 to 1.3, preferably from 0.8 to 1.2, more preferably from 0.9 to 1.1. As used herein, the term "the degree of neutralization of the carboxyl groups" refers to the ratio of the amount of the added alkali to the amount of the alkali required to neutralize all carboxyl groups. When all carboxyl groups are exactly neutralized, the degree of neutralization is 1. The degree of neutralization of the carboxyl groups is that of the carboxyl groups in the acrylic resin-based polymer latex and/or the styrene-acrylic resin-based polymer latex (B), but not that of the carboxyl groups in the chloroprene rubber-based polymer latex composition. The degree of neutralization of the carboxyl groups in the chloroprene rubber-based polymer latex composition can differ from the degree of neutralization of the carboxyl groups in the acrylic resin-based polymer latex and/or the styrene-acrylic resin-based polymer latex (B), depending on the pH or other properties of the chloroprene rubber-based polymer latex (A).

If the degree of neutralization of the carboxyl groups is less than 0.7, the degree of neutralization of abietic acid can decrease due to the effect of the carboxyl groups in the acrylic or styrene-acrylic resin-based polymer obtained by copolymerization of the carboxyl group-containing unsaturated monomer having a pKa of 4.0 or less at 25° C., so that the stability of the chloroprene rubber-based polymer latex composition may tend to decrease. As a result, the reduction in the stability of the chloroprene rubber-based polymer latex composition can cause gelation of the latex, or aggregation of particles can occur to cause stabilization of the latex, so that the initial adhesion may tend to decrease.

On the other hand, if the degree of neutralization of the carboxyl groups is higher than 1.3, the pH of the chloroprene rubber-based polymer latex composition can exceed, during drying, the pH region where gelation of the chloroprene rubber-based polymer latex (A) is facilitated through an insolubilization phenomenon based on the solubility of abietic acid in water, so that the initial adhesion of the chloroprene rubber-based polymer latex composition may tend to decrease.

Examples of the alkali added to the acrylic resin-based polymer latex and/or the styrene-acrylic resin-based polymer latex (B) include sodium hydroxide, potassium hydroxide, ammonia water, or the like. To improve the initial adhesion, ammonia water is preferably added.

In the acrylic resin-based polymer or the styrene-acrylic resin-based polymer, the amount of the unit derived from the carboxyl group-containing monomer is from 0.5 to 2.5 parts by mass, preferably from 1 to 2 parts by mass, based on 100 parts by mass of the total amount of the monomer unit derived from the (meth)acrylic ester and the monomer unit derived from styrene. If the amount of the unit derived from the carboxyl group-containing monomer in the acrylic resin-based polymer or the styrene-acrylic resin-based polymer is less than 0.5 parts by mass based on 100 parts by mass of the total amount of the monomer unit derived from the (meth) acrylic ester and the monomer unit derived from styrene, it can be difficult to obtain a pH region where gelation of the chloroprene rubber-based polymer latex (A) is achieved through an insolubilization phenomenon based on the solubility of abietic acid in water, so that the initial adhesion of the chloroprene rubber-based polymer latex composition can decrease. In addition, the stability of the acrylic resin-based polymer latex or the styrene-acrylic resin-based polymer latex (B) itself can decrease, so that to compensate for the reduction in the stability, it can be necessary to increase the amount of the surfactant, which can make it difficult to attain a good balance between the initial adhesion and the stability of the chloroprene rubber-based polymer latex composition. On the other hand, if the amount of the unit derived from the carboxyl group-containing monomer in the acrylic resin-based polymer or the styrene-acrylic resin-based polymer is more than 2.5 parts by mass based on 100 parts by mass of the total amount of the monomer unit derived from the (meth) acrylic ester and the monomer unit derived from styrene, the acrylic resin-based polymer latex or the styrene-acrylic resin-based polymer latex (B) can have too high viscosity, which can make difficult the blending with the chloroprene rubber-based polymer latex (A).

The acrylic resin-based polymer latex and/or the styrene-acrylic resin-based polymer latex (B) used in the invention contains the acrylic resin-based polymer stabilized with a surfactant and/or the styrene-acrylic resin-based polymer stabilized with a surfactant.

The acrylic resin-based polymer latex or the styrene-acrylic resin-based polymer latex (B) used in the invention can be produced by a known emulsion polymerization method using the unsaturated monomers component described above. The glass transition temperature of the acrylic resin-based polymer or the styrene-acrylic resin-based polymer is preferably, but not limited to, −50 to 20° C., more preferably −40 to 10° C., even more preferably −30 to 0° C. If the acrylic resin-based polymer or the styrene-acrylic resin-based polymer has a glass transition temperature lower than −50° C., its heat-resistant adhesive strength can decrease with decreasing cohesive strength. On the other hand, if the acrylic resin-based polymer or the styrene-acrylic resin-based polymer has a glass transition temperature higher than 20° C., the acrylic resin-based polymer or the styrene-acrylic resin-based polymer component can fail to have flexibility at room temperature, so that it can form a hard adhesive layer. When the glass transition temperature is measured, the latex is dried to form a 0.2 to 2 mm thick film-shaped test piece, and the measurement of the glass transition temperature is performed on the test piece using differential scanning calorimetry (DSC).

In the invention, the surfactant used in the acrylic resin-based polymer latex or the styrene-acrylic resin-based polymer latex (B) may be any type of reactive or nonreactive anionic surfactant and/or nonionic surfactant. The surfactant is preferably used in an amount of 1 part by mass or less based on 100 parts by mass of the acrylic resin-based polymer latex or the styrene-acrylic resin-based polymer latex (B) so that the surfactant will not inhibit the gelation of the chloroprene rubber-based polymer latex (A), which is caused by an insolubilization phenomenon based on the water solubility of abietic acid or other materials used as a surfactant for the chloroprene rubber-based polymer latex (A). To stably produce the acrylic resin-based polymer latex, it is preferable to use only an anionic surfactant or to use an anionic surfactant in combination with a nonionic surfactant.

The acrylic resin-based polymer latex or the styrene-acrylic resin-based polymer latex (B) used in the invention may contain an additive that can be added to the chloroprene rubber-based polymer latex composition of the invention as described below.

The solid concentration of the acrylic resin-based polymer latex or the styrene-acrylic resin-based polymer latex (B) is generally, but not limited to, 40 to 65% by mass.

The viscosity of the acrylic resin-based polymer latex or the styrene-acrylic resin-based polymer latex (B) is preferably, but not limited to, 10,000 mPa·s or less in view of the workability in blending the latex (B) with the chloroprene rubber-based polymer latex (A). The viscosity is the value measured using a Brookfield type viscometer (BH type with a No. 4 rotor) under the conditions of 23° C. and a rotation speed of 10 rpm.

The chloroprene rubber-based polymer used in the invention may be a polymer composed mainly of a monomer unit derived from chloroprene. The content of the monomer unit derived from chloroprene is preferably 98% by mass or more, more preferably 100% by mass. In addition to the chloroprene monomer, other monomers copolymerizable with the chloroprene monomer may be used to form the chloroprene rubber-based polymer. Examples of such copolymerizable monomers include butadiene, isoprene, styrene, acrylonitrile, acrylic acid, methacrylic acid, and esters thereof.

The chloroprene rubber-based polymer latex (A) used in the invention includes the chloroprene rubber-based polymer stabilized with a surfactant.

In the invention, the surfactant used in the chloroprene rubber-based polymer latex (A) may be any anionic surfactant having a carboxyl group. The surfactant is preferably capable of facilitating gelation of the chloroprene rubber-based polymer latex through an insolubilization phenomenon based on its solubility in water. More specifically, the surfactant may be an alkali salt of rosin acid composed mainly of abietic acid, such as a potassium or sodium salt thereof, or a combination of the potassium and sodium salts thereof, because when such a salt is used, stabilization of the colloidal state or destabilization for the formation of an adhesive layer can be easily achieved by controlling pH. A potassium or sodium salt of abietic acid is preferred because gelation of the chloroprene rubber-based polymer latex can be successfully achieved using it.

In the invention, the amount of the surfactant used in the chloroprene rubber-based polymer latex (A) is preferably from 1 to 8 parts by mass, more preferably from 2 to 5 parts by mass, based on 100 parts by mass of the solid in the chloroprene rubber-based polymer latex (A). If the amount of the surfactant is less than 1 part by mass based on 100 parts by mass of the solid in the chloroprene rubber-based polymer latex (A), insufficient emulsification can easily occur, so that a problem such as a defective product may tend to easily occur due to poor control of suppression of polymerization-induced heat generation or due to production of aggregates. If the amount of the surfactant is more than 8 parts by mass, the surfactant residue can degrade the water resistance of the polymer, so that the adhesive strength may tend to decrease and a problem such as foaming or degradation of product color during drying may tend to easily occur.

The chloroprene rubber-based polymer latex (A) used in the invention may contain an additive that may be added to the chloroprene rubber-based polymer latex composition of the invention as described below.

The solid derived from the chloroprene rubber-based polymer latex (A) preferably makes up 60 to 95% by mass, more preferably 70 to 90% by mass, even more preferably 75 to 85% by mass of the total solid in the chloroprene rubber-based polymer latex composition of the invention. If the solid derived from the chloroprene rubber-based polymer latex (A) makes up less than 60% by mass of the total solid in the chloroprene rubber-based polymer latex composition of the invention, the degree of neutralization of the anionic surfactant having a carboxyl group may decrease due to the effect of the carboxyl groups in the acrylic resin-based polymer or the styrene-acrylic resin-based polymer, so that storage stability may tend to decrease. If it makes up more than 95% by mass of the total solid, the chloroprene rubber-based polymer latex (A) and the acrylic resin-based polymer latex and/or the styrene-acrylic resin-based polymer latex (B) may fail to have a synergistic effect, so that the chloroprene rubber-based polymer latex composition may tend to have lower initial adhesion.

The solid derived from the acrylic resin-based polymer latex and/or the styrene-acrylic resin-based polymer latex (B) preferably makes up 5 to 40% by mass, more preferably 10 to 30% by mass, even more preferably 15 to 25% by mass of the total solid in the chloroprene rubber-based polymer latex composition of the invention. If the total content of the acrylic resin-based polymer latex and/or the styrene-acrylic resin-based polymer latex (B) is less than 5% by mass, the chloroprene rubber-based polymer latex (A) and the acrylic resin-based polymer latex or the styrene-acrylic resin-based polymer latex (B) may fail to have a synergistic effect, so that the chloroprene rubber-based polymer latex composition may tend to have lower initial adhesion. If the total content is more than 40% by mass, the degree of neutralization of the anionic surfactant having a carboxyl group may decrease due to the effect of the carboxyl groups in the acrylic resin-based polymer or the styrene-acrylic resin-based polymer, so that storage stability may tend to decrease.

In the chloroprene rubber-based polymer latex composition of the invention, the mass ratio of the solid in the chloroprene rubber-based polymer latex (A) to the solid in the acrylic resin-based polymer latex and/or the styrene-acrylic resin-based polymer latex (B) is from 60/40 to 95/5, preferably from 70/30 to 90/10, more preferably from 75/25 to 85/15.

The chloroprene rubber-based polymer latex (A) as a main component of the chloroprene rubber-based polymer latex composition of the invention may be of any type as long as it is stabilized with an anionic surfactant having a carboxyl group. The chloroprene rubber-based polymer latex (A) is preferably stabilized with an anionic surfactant including a potassium salt of rosin acid and/or a sodium salt of rosin acid. To design the latex to have good contact properties, heat-resistant adhesion, and water resistance, the chloroprene rubber-based polymer latex described in WO 2011/065524 A is preferably used.

If necessary, the chloroprene rubber-based polymer latex composition of the invention may contain an additional component other than the chloroprene rubber-based polymer latex (A) and the acrylic resin-based polymer latex or styrene-acrylic resin-based polymer latex (B). A dibasic acid ester plasticizer is effective in producing the initial adhesive strength and contact properties, although such a plasticizer is not an essential component. As far as circumstances permit, however, the amount of such an additive should be kept as small as possible. Examples of dibasic acid ester plasticizers include dialkyl phthalate esters, dialkyl adipate esters, dialkyl sebacate esters, or the like. The content of the dibasic acid ester plasticizer is preferably 10% by mass or less based on the amount of the solid in the chloroprene rubber-based polymer latex (A).

In adhesive applications, discoloration and sanitary properties of bonded glue line often raise a problem. Thus, the chloroprene rubber-based polymer latex composition of the invention preferably contains an antioxidant, and a hindered phenol antioxidant is preferably used. Examples of such a hindered phenol antioxidant include 2,2'-methylenebis (4-ethyl-6-tert-butylphenol), 2,2'-methylenebis (4-methyl-6-tert-butylphenol), 4,4'-butylidenebis(3-methyl-6-tert-butylphenol), and a butylated reaction product of p-cresol and dicyclopentadiene. The antioxidant is preferably added in an amount of 0.1 to 3 parts by mass, more preferably in an amount of 0.5 to 2 parts by mass, based on 100 parts by mass of the solid in the chloroprene rubber-based polymer latex. If the antioxidant is added in an amount of less than 0.1 parts by mass, the antioxidant effect may be insufficient, and if it exceeds 3 parts by mass, the pressure-sensitive adhesive strength or the adhesive strength may undesirably decrease.

The chloroprene rubber-based polymer latex composition of the invention may contain an appropriate additive other than the above, such as an anionic or nonionic surfactant, a filler, a tackifier, a pigment, a colorant, a wetting agent, an antifoaming agent, or a thickener, as long as the effects of the invention are not impaired. Based on the total amount of the composition, up to 10% by mass (solid basis) of any other resin polymer latex may also be added as an auxiliary component to the composition. Examples of such a resin polymer latex include a (modified) polyvinyl acetate latex, a vinyl acetate-acrylic copolymer latex, a urethane latex, and other resin polymer latexes.

In the invention, examples of suitable adherends include foams made of polyurethane, ethylene-vinyl acetate copolymers, polyethylene, or other materials, and water-absorbing adherends such as wood, fabrics, and clothes.

The chloroprene rubber-based polymer latex composition produced under the conditions described above is suitable for practical use as a one-component aqueous adhesive, which has good initial adhesive strength and contact properties, water resistance, spray-coatability, and storage stability.

Hereinafter, the invention will be described with reference to examples and comparative examples, which however are not intended to limit the invention at all. Unless otherwise specified, the term “parts” in the examples and the comparative examples means “parts by mass.” The pKa values in the examples and the comparative examples are values at around 25° C. cited from SciFinder (Chemical Abstracts Service, available online, URL: https://scifinder.cas.org).

EXAMPLES

Synthesis Example B-1

Preparation of Styrene-Acrylic Resin Latex (B-1) (1 Part by Mass of Itaconic Acid, a Degree of Neutralization of 0.96)

A reaction vessel equipped with a stirrer, a thermometer, a reflux condenser, and a dropping funnel was charged with 1,000 parts of ion-exchanged water, 5 parts of HITENOL 08E (manufactured by Dai-ichi Kogyo Seiyaku Co., Ltd., polyoxyethylene oleyl cetyl ether sulfate ammonium), and 15 parts of EMULGEN 147 (manufactured by Kao Corporation, polyoxyethylene lauryl ether), and the mixture was heated to 70° C. On the other hand, 1,500 parts of ion-exchanged water, 1,440 parts of styrene, 1,560 parts of 2-ethylhexyl acrylate, 30 parts of 2-hydroxyethyl methacrylate, 45 parts of acrylamide, 30 parts of itaconic acid (pKa=3.86), and 20 parts of HITENOL 08E were emulsified with a homomixer to form a mixed emulsion (A). To the reaction vessel were added 2 parts of potassium persulfate and 1 part of sodium bisulfite. The mixed emulsion (A), 400 parts of a 2% potassium persulfate aqueous solution, and 200 parts of 2% sodium bisulfite were each added dropwise from a dropping funnel to the reaction vessel over 4 hours when the mixture was subjected to polymerization. During this process, the inside of the reaction vessel was kept at 70° C. After the dropwise addition was completed, the product was aged by being kept at 70° C. for 2 hours. Subsequently, the product was started to be cooled. After the product was cooled to 30° C., 30 parts of 25% ammonia water was added to the product. In this case, the degree of neutralization of the carboxyl groups was 0.96. The resulting styrene-acrylic resin latex had a viscosity of 4,000 mPa·s (as measured using a Brookfield type viscometer with a No. 4 rotor at 10 rpm (hereinafter, the same applies to the measurement)), a pH of 8.7, and a non-volatile content of 49.9%. The non-volatile content is the content of the dry residue obtained after drying at 105° C. for 1 hour. The same applies hereinafter.

Synthesis Example B-2

Preparation of Styrene-Acrylic Resin Latex (B-2) (2 Parts by Mass of Itaconic Acid, a Degree of Neutralization of 0.96)

Polymerization was performed as in Synthesis Example B-1, except that the amount of itaconic acid (pKa=3.86) was changed to 60 parts and the amount of 25% ammonia water was changed to 60 parts. In this case, the degree of neutralization of the carboxyl groups was 0.96. The resulting styrene-acrylic resin latex (B-2) had a viscosity of 6,000 mPa·s, a pH of 8.8, and a non-volatile content of 50.2%.

Synthesis Example B-3

Preparation of Styrene-Acrylic Resin Latex (B-3) (1 Part by Mass of Itaconic Acid, a Degree of Neutralization of 0.48)

Polymerization was performed as in Synthesis Example B-1, except that the amount of 25% ammonia water was changed to 15 parts. In this case, the degree of neutralization of the carboxyl groups was 0.48. The resulting styrene-acrylic resin latex (B-3) had a viscosity of 6,000 mPa·s, a pH of 6.5, and a non-volatile content of 50.2%.

Synthesis Example B-4

Preparation of Styrene-Acrylic Resin Latex (B-4) (1 Part by Mass of Itaconic Acid, a Degree of Neutralization of 1.44)

Polymerization was performed as in Synthesis Example B-1, except that the amount of 25% ammonia water was changed to 45 parts. In this case, the degree of neutralization of the carboxyl groups was 1.44. The resulting styrene-acrylic resin latex (B-4) had a viscosity of 5,000 mPa·s, a pH of 9.7, and a non-volatile content of 50.0%.

Synthesis Example B-5

Preparation of Styrene-Acrylic Resin Latex (B-5) (3 Parts by Mass of Itaconic Acid, a Degree of Neutralization of 0.96)

Polymerization was performed as in Synthesis Example B-1, except that the amount of itaconic acid (pKa=3.86) was changed to 90 parts and the amount of 25% ammonia water was changed to 90 parts. In this case, the degree of neutralization of the carboxyl groups was 0.96. The resulting styrene-acrylic resin latex (B-5) had a viscosity of 9,000 mPa·s, a pH of 8.7, and a non-volatile content of 50.2%.

Synthesis Example B-6

Preparation of Styrene-Acrylic Resin Latex (B-6) (2 Parts by Mass of Methacrylic Acid, a Degree of Neutralization of 0.95)

Polymerization was performed as in Synthesis Example B-1, except that 60 parts of methacrylic acid (pKa=4.58) was used instead of 30 parts of itaconic acid and the amount of ammonia water was changed to 45 parts. In this case, the degree of neutralization of the carboxyl groups was 0.95. The resulting styrene-acrylic resin latex had a viscosity of 9,000 mPa·s, a pH of 8.7, and a non-volatile content of 50.2%.

Synthesis Example B-7

Preparation of Styrene-Acrylic Resin Latex (B-7) (2 Parts by Mass of Methacrylic Acid, a Degree of Neutralization of 0.53)

Polymerization was performed as in Synthesis Example B-1, except that 60 parts of methacrylic acid (pKa=4.58) was used instead of 30 parts of itaconic acid and the amount of ammonia water was changed to 25 parts. In this case, the degree of neutralization of the carboxyl groups was 0.53. The resulting styrene-acrylic resin latex had a viscosity of 6,000 mPa·s, a pH of 8.8, and a non-volatile content of 50.1%.

Synthesis Example B-8

Preparation of Styrene-Acrylic Resin Latex (B-8) (2 Parts by Mass of Acrylic Acid, a Degree of Neutralization of 1.05)

Polymerization was performed as in Synthesis Example B-1, except that 60 parts of acrylic acid (pKa=4.25) was used instead of 30 parts of itaconic acid and the amount of ammonia water was changed to 60 parts. In this case, the degree of neutralization of the carboxyl groups was 1.05. The resulting styrene-acrylic resin latex had a viscosity of 9,000 mPa·s, a pH of 9.9, and a non-volatile content of 50.0%.

Synthesis Example B-9

Preparation of Styrene-Acrylic Resin Latex (B-9) (2 Parts by Mass of Acrylic Acid, a Degree of Neutralization of 0.53)

Polymerization was performed as in Synthesis Example B-1, except that 60 parts of acrylic acid (pKa=4.25) was used instead of 30 parts of itaconic acid and the amount of ammonia water was changed to 30 parts. In this case, the degree of neutralization of the carboxyl groups was 0.53. The resulting styrene-acrylic resin latex had a viscosity of 9,000 mPa·s, a pH of 8.9, and a non-volatile content of 50.0%.

Examples 1 and 2

Chloroprene rubber-based polymer latex (A), SD77S with a solid content of 55% by mass (manufactured by Showa Denko K. K. and containing, as a surfactant, an alkali salt of rosin acid (rosin soap) composed mainly of abietic acid) was mixed with the styrene-acrylic resin latex (B-1 or B-2) with a solid content of 50% by mass in such a manner that the mass ratio of the solid in the former to the solid in the latter was 75/25, so that a one-component adhesive composition was obtained.

Comparative Example 1

Chloroprene rubber-based polymer latex (A), SD77S with a solid content of 55% by mass (manufactured by Showa Denko K. K.) was used without modification as a one-component adhesive composition.

Comparative Examples 2 to 8

Chloroprene rubber-based polymer latex (A), SD77S with a solid content of 55% by mass (manufactured by Showa Denko K. K.) was mixed with the styrene-acrylic resin latex (B-3, B-4, B-5, B-6, B-7, B-8, or B-9) with a solid content of 50% by mass in such a manner that the mass ratio of the solid in the former to the solid in the latter was 75/25, so that a one-component adhesive composition was obtained.

Comparative Example 9

Chloroprene rubber-based polymer latex (A), SD77S with a solid content of 55% by mass (manufactured by Showa Denko K. K.) was mixed with the styrene-acrylic resin latex (B-1) with a solid content of 50% by mass in such a manner that the mass ratio of the solid in the former to the solid in the latter was 97.5/2.5, so that a one-component adhesive composition was obtained.

Comparative Example 10

Chloroprene rubber-based polymer latex (A), SD77S with a solid content of 55% by mass (manufactured by Showa Denko K. K.) was mixed with the styrene-acrylic resin latex (B-1) with a solid content of 50% by mass in such a manner that the mass ratio of the solid in the former to the solid in the latter was 50/50, so that a one-component adhesive composition was obtained.

minutes. A pair of opposite sides of the urethane cubes were held with chucks, respectively, in such a manner that the distance between the upper and lower chucks was 6.5 cm, and the peel strength was measured at a tensile rate of 200 mm/minute using a tensile tester.

(70° C. Storage Stability Test)

The chloroprene rubber-based polymer latex composition was heat-treated at 70° C. for 6 days and then evaluated for the presence or absence of gelation.

Table 1 shows the results of the evaluation of the one-component adhesive composition obtained in each of Examples 1 to 2 and Comparative Examples 1 to 10.

TABLE 1

| | | Styrene-acrylic resin-based polymer latex | | | | | | | |
|---|---|---|---|---|---|---|---|---|---|
| | Solid content (mass %) of chloroprene resin-based polymer latex in chloroprene resin-based polymer latex composition | Solid content (mass %) of solid in chloroprene resin-based polymer latex composition | Type | Type of carboxyl group-containing monomer | Amount of carboxyl group-containing monomer based on 100 parts by mass of the total amount of (meth)acrylic ester monomer and styrene monomer | Degree of neutralization of carboxyl groups | pH | Initial adhesion | 70° C. storage stability |
| Example 1 | 75 | 25 | B-1 | Itaconic acid | 1 part by mass | 0.96 | 9.6 | 90N | No abnormalities |
| Example 2 | 75 | 25 | B-2 | Itaconic acid | 2 parts by mass | 0.96 | 9.5 | 100N | No abnormalities |
| Comparative Example 1 | 100 | 0 | — | — | — | — | 10.9 | Less than 10N | No abnormalities |
| Comparative Example 2 | 75 | 25 | B-3 | Itaconic acid | 1 part by mass | 0.48 | 8.0 | Unmeasurable because of aggregation or solidification of latex particles | Aggregation or solidification of latex particles |
| Comparative Example 3 | 75 | 25 | B-4 | Itaconic acid | 1 part by mass | 1.44 | 9.4 | 20N | No abnormalities |
| Comparative Example 4 | 75 | 25 | B-5 | Itaconic acid | 3 parts by mass | 0.96 | 9.6 | 90N | Aggregation or solidification of latex particles |
| Comparative Example 5 | 75 | 25 | B-6 | Methacrylic acid | 2 parts by mass | 0.95 | 9.8 | Less than 10N | No abnormalities |
| Comparative Example 6 | 75 | 25 | B-7 | Methacrylic acid | 2 parts by mass | 0.53 | 9.0 | Less than 10N | Aggregation or growth of latex particles |
| Comparative Example 7 | 75 | 25 | B-8 | Acrylic acid | 2 parts by mass | 1.05 | 9.9 | 10N | No abnormalities |
| Comparative Example 8 | 75 | 25 | B-9 | Acrylic acid | 2 parts by mass | 0.53 | 9.1 | Less than 10N | Aggregation or growth of latex particles |
| Comparative Example 9 | 97.5 | 2.5 | B-1 | Itaconic acid | 1 part by mass | 0.96 | 8.6 | 20N | No abnormalities |
| Comparative Example 10 | 50 | 50 | B-1 | Itaconic acid | 1 part by mass | 0.96 | 8.9 | 20N | No abnormalities |

(Performance Evaluation)

After the blending, each prepared chloroprene rubber-based polymer latex composition was allowed to stand for at least 3 days and then evaluated for initial adhesion and storage stability at 70° C.

(Initial Adhesive Strength)

Two 5-cm-square urethane foam cubes were used as adherends. The chloroprene rubber-based polymer latex composition was uniformly applied to one side of each cube with a nylon toothbrush. The total amount of the latex applied to both sides was 1 g. After the applied composition was allowed to stand for 1 minute, the cubes were securely bonded together with both hands and then allowed to stand for 2

The invention claimed is:

1. A chloroprene rubber-based polymer latex composition, comprising a mixture of (A) a chloroprene rubber-based polymer latex and (B) an acrylic resin-based polymer latex and/or a styrene-acrylic resin-based polymer latex, wherein the acrylic resin-based polymer latex and/or the styrene-acrylic resin-based polymer latex (B) contains an acrylic resin-based polymer having a unit derived from itaconic acid and/or a styrene-acrylic resin-based polymer having a unit derived from itaconic acid, an alkali is added to the acrylic resin-based polymer latex and/or the styrene-acrylic resin-based polymer latex (B), the chloroprene rubber-based polymer latex (A) contains an anionic surfactant having a carboxyl group, and satisfying formula (1):

[Mathematical Formula 1]

$$pKa1 \geq pKa2+0.6 \quad (1)$$

wherein pKa1 represents the pKa of the anionic surfactant at 25° C., and pKa2 represents the pKa of itaconic acid at 25° C.

2. The chloroprene rubber-based polymer latex composition according to claim 1, wherein the anionic surfactant is abietic acid.

3. A one-component aqueous adhesive comprising the chloroprene rubber-based polymer latex composition according to claim 1.

4. The chloroprene rubber-based polymer latex composition according to claim 1, wherein pKa2 is at most 4.0.

5. The chloroprene rubber-based polymer latex composition according to claim 1, wherein the acrylic resin-based polymer latex and/or the styrene-acrylic resin-based polymer latex (B) contains an acrylic resin-based polymer having 0.5 to 2.5 parts by mass of a unit derived from itaconic acid and/or a styrene-acrylic resin-based polymer having 0.5 to 2.5 parts by mass of a unit derived from itaconic acid based on 100 parts by mass of the total amount of monomer units derived from a (meth)acrylic ester and styrene.

6. The chloroprene rubber-based polymer latex composition according to claim 1, wherein the carboxyl group of a unit derived from itaconic acid is neutralized with an alkali so that a degree of neutralization of 0.7 to 1.3 is attained.

7. The chloroprene rubber-based polymer latex composition according to claim 1, wherein the mass ratio of the solid in the chloroprene rubber-based polymer latex (A) to the solid in the acrylic resin-based polymer latex and/or the styrene-acrylic resin-based polymer latex (B) is from 60/40 to 95/5.

8. The chloroprene rubber-based polymer latex composition according to claim 1, wherein the amount of the surfactant used in the chloroprene rubber-based polymer latex (A) is from 1 to 8 parts by mass based on 100 parts by mass of the solid in the chloroprene rubber-based polymer latex (A).

* * * * *